Patented Nov. 15, 1938

2,136,785

UNITED STATES PATENT OFFICE 2,136,785

PROCESS FOR POLYMERIZING HYDROCARBONS

William N. Davis, Berkeley, Calif., assignor to Standard Oil Company of California, San Francisco, Calif., a corporation of Delaware No Drawing. Application March 9, 1936, Serial No. 67,920

4 Claims. (Cl. 196—10)

This invention relates to a process for the polymerization of normally gaseous olefine hydrocarbons to low boiling liquids suitable for use as motor fuels and especially to a process wherein the polymerization is effected by an acid-film type of catalyst. More particularly the invention pertains to a process suitable for use with a supply of olefine containing gas which is subject to wide fluctuations in the amount available for polymerization.

The polymerization of normally gaseous olefines to liquids boiling in the range of gasoline and suitable as a motor fuel became economically possible with the widespread production of vast quantities of olefines containing from two to five carbon atoms per molecule as a by-product of the cracking of petroleum and became particularly desirable when it was discovered that such polymers could be produced which could be used as fuel in the modern high compression motors with a high degree of freedom from detonation. Both thermal and catalytic means have been extensively studied for effecting such polymerization.

Many advantages have now been demonstrated to be more or less inherent in the catalytic method of polymerization and numerous specific catalysts have been developed to meet some particular requirement imposed either by the raw material available or the product desired or both.

In general the strong inorganic oxy-acids and their salts or special derivatives have been found to constitute the preferred group of catalytically active materials. Of these, the acids of phosphorus have probably received the widest attention and have been most highly developed in the numerous special forms in which they have been applied. Both the liquid and solid acids have been used as such, various of the normal and acid salts have been employed, the liquid acids have been absorbed in highly porous silicious materials such as diatomaceous earth and calcined to produce the so-called "solid acid" catalysts and the liquid acids have been adsorbed in thin films on substantially non-porous inert materials such as glassy quartz to give the "acid-film type" catalysts, each group with its own particular set of characteristics.

Of these several groups of phosphoric acid catalysts the latter, acid-film type, has been found to possess a combination of characteristics which cause it to stand out as the most nearly ideal in meeting all of the requirements for efficient, economical, trouble-free, flexible commercial operation. It is to a feature of operation which is particularly pertinent to a process employing this type of catalyst that the present invention pertains though its applicability to processes employing other catalysts such as the "solid acid" type will be readily appreciated.

As is well known, the bulk of gaseous olefines which are at present readily available for polymerization to liquid motor fuels is produced during the cracking of petroleum oils. The amount of gas produced, its total content of olefines and the proportions of individual olefines are found to vary not only with the oil cracked but with the extent to which cracking is carried and the specific combination of physical conditions under which it is effected. Since for obvious reasons of stock balance and product requirements it is the exception rather than the rule for any commercial cracking plant to operate continually on the same raw material to effect the same degree of cracking under the same conditions it follows that both the composition and the gross quantity of gas which is available from any such plant to an associated polymerization unit will be quite variable. An even greater fluctuation in the quantity of gas produced is due to the unavoidable intermittence in operation of the individual units of any cracking plant resulting from the frequency with which alterations and repairs are required by apparatus in such severe service. The trend toward smaller numbers and increased size of individual cracking units has still further accentuated this latter element of fluctuation.

The net result is thus that a polymerization unit to utilize the fluctuating supply of raw material from any actual cracking plant in an efficiently continuous process for producing a uniform polymer product must either comprise large and expensive reserve storage facilities or possess a degree of elasticity not reasonably to be expected in the commercial operation of what is at best a critical process.

The object of this invention is broadly to provide a method of operating a catalytic polymerization process employing an acid catalyst in a smooth and continuous manner on a fluctuating supply of olefine containing raw material without recourse to the expedient of considerable reserve gas storage. More specific objects will be apparent from the description and discussion which follows:

The polymerization of gaseous olefine hydrocarbons to yield a liquid product which shall contain no polymer higher than a trimer and in certain instances none higher than the dimer is a reaction which is different in many fundamental respects from the ordinary chemical reaction. In order, therefore, to understand the operation of any process for effecting such a polymerization these several points of peculiarity must be clearly appreciated.

Quite frequently when the supply of raw material available for a continuous chemical process is for any reason reduced the rate of flow through the process is merely reduced in proportion and the only result is a reduction in output from the plant. The extent of an olefine polymerization is however roughly proportional to the length of time the polymerizable material is subjected to the polymerizing conditions and hence to reduce the rate of passage to accommodate a reduction in the supply of raw material would obviously result in over-polymerization. When the degree of polymerization permissible in the production of a given product is limited to dimerization or at most to trimerization any such reduction in rate with its resultant over-polymerization is obviously untenable.

In many other well known instances of continuous chemical processes a reduction in the temperature of operation may be employed to reduce the rate of the reaction to accommodate a reduction in the supply of raw material to the process. The composition of a polymer liquid resulting from the polymerization of a mixture of several different olefines, such as is contained in a gas produced in the cracking of petroleum, is however directly dependent upon the temperature at which polymerization is effected. Variation is probably due in part to the different proportions of individual olefines which are polymerized at different temperatures and in part to differences in the amount of interaction between the several individual olefines. In any event constancy of temperature is imperative to constant composition of the polymer product and thus precludes the utilization of reduced operating temperatures to compensate for a reduction in the amount of feed material available to a mixed olefine polymerization process.

In still other well known chemical processes it is possible to maintain a constant bulk of material through a given plant in spite of variations in amount of reactants available by cycling more or less of some inert diluent. Of the several customary expedients for obtaining constant process operation with variable materials supply this latter is most nearly applicable to a polymerization process though differences in the degree of dilution of gaseous olefines may still somewhat influence the nature of the polymer product. The increased cost of such operation per unit of product is also against its adoption wherever other methods are possible.

It has been discovered that still another method of compensation may be employed in a process for polymerizing gaseous olefines with an acid catalyst and particularly with a phosphoric acid film type catalyst which is subject to none of the foregoing enumerated objections and which introduces no new difficulties of its own. This is based upon the fact that only the rate and not the proportion or degree of polymerization of mixed gaseous olefines is influenced by the concentration of the acid employed as catalyst. This fact makes it possible to vary the capacity of a given plant to accommodate a variable supply of raw material merely by appropriately varying the concentration of the acid catalyst and without disturbing any of the factors which determine the composition of the product.

It has been further found that with phosphoric acid there is a concentration range in which the rate of olefine polymerization is variable between surprisingly wide limits with only slight changes in the concentration of acid employed as the catalyst, all other factors remaining constant. The following data are illustrative of this point. They were obtained in operation with acid-film type catalysts in which phosphoric acid of the indicated strength was adsorbed on 10–20 mesh broken glassy quartz particles supported in an appropriate reaction tower.

TABLE I

Polymerizing activity of phosphoric acids

| Percent $H_3PO_4$ | Gal. polymer/cu. ft. catalyst/24 hrs. |
|---|---|
| 80 | 0.90 |
| 90 | 1.60 |
| 95 | 3.50 |
| 100 | 12.50 |
| 110 | 13.20 |

The practically constant rate of polymerization effected by a catalyst in which the acid is at a concentration of from 100 to 110% $H_3PO_4$ indicates the range in which operation would normally occur and upon which a plant would be designed to accommodate the maximum quantity of gas ordinarily available. The approximately four-fold change in rate between 100% and 95% $H_3PO_4$ would then be availed of to compensate for any probable variations in gas supply.

It follows from these data, that by the adjustment of acid concentration in any liquid phosphoric acid catalyst a constant percent polymerization may be maintained with varying rates of gas passage while the conditions of pressure, temperature and degree of dilution, which determine the nature and extent of polymerization are held constant. While apparently the form of catalyst employed or the means by which the acid concentration is adjusted should make no difference in the result obtained, from the practical standpoint both may be of the utmost importance.

With an acid-film type of catalyst in which the total amount of acid is small, equivalent on the average to about 3.5 pounds of phosphoric anhydride per bulk cubic foot of 10–20 mesh support, the small amounts of water required and the ready accessibility of the acid make possible very rapid changes of several percent in acid concentration by simply varying the water vapor content of the gas to be polymerized. For any given temperature of operation the partial pressure of water vapor necessary to give the acid concentration desired may be approximated with sufficient accuracy from the data of Table II.

TABLE II

Water vapor pressure over phosphoric acid solutions

| Acid | °F. | Mm. Hg. | °F. | Mm. Hg. |
|---|---|---|---|---|
| 95.0% $H_3PO_4$ | 140 | 0.90 | 400 | 400.0 |
| 99.8% $H_3PO_4$, 72.2% $P_2O_5$ | 140 | 0.14 | 400 | 100.0 |
| 109.5% $H_3PO_4$, 79.4% $P_2O_5$ | 230 | 0.04 | 540 | 70.0 |

Having determined the temperature and percentage polymerization of the olefines contained in the gas available, which together will lead to the desired polymer product it becomes a simple matter to determine the necessary rate of gas passage through a given catalyst chamber to effect the proper percent of polymerization. Thereafter it is possible by varying the concentration of acid in the catalyst in accord with the reaction rates given in Table I, to maintain the percentage polymerization and hence the nature of the product constant, in spite of variations in the amount of gas available. Obviously this may be accomplished by varying the humidity of the gas more or less inversely with the rate of gas passage.

The acid concentration in a film type catalyst follows the humidity of the gas so rapidly that when means are provided for correctly controlling the latter by the amount of gas entering the catalyst chamber the constancy of the polymer product may be automatically insured. The means for adjusting the humidity of the gas and for coordinating the humidity with the amount of gas may obviously be selected at will without departing from the foregoing principles and hence without departing from the spirit of this invention.

It has been found that gases from the cracking of petroleum must be purified by washing with dilute acid, as disclosed and claimed in an application Serial No. 67,918 copending herewith to remove traces of alkaline reacting catalyst poisons, usually present, in order to secure long catalyst life. It is also usually desirable to remove by an appropriate alkaline wash acid reacting sulfur bodies such as hydrogen sulfide and mercaptans, which if allowed to remain are condensed during the polymerization reaction and result in bodies which are difficult to remove from the product.

Since both such purification treatments are usually effected by means of aqueous solutions they must obviously precede any humidity control operation or be made a part of such operation.

The complete process of this invention may now be illustrated by brief reference to a specific example. An olefine containing gas such as derived from the cracking of a petroleum oil and containing 30 to 40% total olefines is fractionated to give a cut consisting substantially of butane and the three isomeric butenes. It is then purified by washing with a 5 to 10% solution of sulfuric acid and a solution of caustic soda.

Polymerization at a temperature of 300° F., a pressure of about 200 pounds per square inch, a catalyst acid strength of about 100% $H_3PO_4$ and a space velocity through the catalyst of about 1.0 is desired. The partial water vapor pressure of the purified gas is accordingly adjusted to correspond to about 10.2 millimeters of mercury immediately prior to passing the gas over the catalyst. It is soon found however that the rate of gas production at the cracking plant has been reduced by about 20% and consequently there is sufficient gas available to maintain only a space velocity of 0.80 through the catalyst which if permitted without any compensating change will give a considerable proportion of liquid polymer boiling above the range which is permissible in the particular product desired. The water vapor pressure in the gas is accordingly adjusted to about 25.0 millimeters of mercury which quickly brings the acid in the catalyst to about 98% $H_3PO_4$ having a polymerizing activity of approximately 0.8 that of 100% acid. Operation may thus proceed with the reduced flow of gas and the nature of the polymer product remain unchanged.

The appropriate partial water vapor pressure in the gas to correspond to other conditions of operation and the changes necessary to accommodate changes in such operation may obviously be arrived at by a similar procedure from the data of Tables I and II.

It has been found that the heat liberated by the polymerization of normally gaseous olefines is sufficient that provision must be made for its controlled dissipation in order to permit of close temperature control in a polymerization process. It has, for instance, been found that when a gas containing 40% of olefines is 95% polymerized sufficient heat is generated to raise the temperature of the reaction mixture by over 200° F. The removal of this energy may be advantageously provided for by dividing the catalyst into two or more series units and inserting an efficient cooling stage therebetween. Such arrangement makes possible the removal of already formed polymer product at the same time and ultimately leads to a higher recovery of olefines per passage through the catalyst without excessive over polymerization.

Ordinarily the first section of a two unit system will contain from 10 to 20% of the catalyst and will be responsible for about 50% of the reaction at the rate of gas passage for which it was designed. If then the rate of gas passage is for any reason materially altered it is imperative that the rate of polymerization be altered in compensation in order to prevent a very serious disturbance in the heat balance in the system. By varying the activity of the catalyst in accord with the process of this invention a method of compensation is provided which prevents any substantial disturbance in the heat balance in an operating plant.

Having now described my invention which consists in a method of controlling the rate of polymerization of normally gaseous olefine hydrocarbons by a phosphoric acid-film catalyst under any given set of operating conditions by controlling the humidity of the gas undergoing polymerization:

I claim:

1. In a process for the catalytic polymerization of normally gaseous olefine hydrocarbons by means of a phosphoric acid-film catalyst the method of controlling the rate of polymerization at constant temperature and pressure without altering its nature or extent to maintain a constant product during changes in the time of reaction which comprises the step of regulating the humidity of the gas passing the catalyst in a ratio inverse to the rate of passage.

2. In a process for the catalytic polymerization of normally gaseous olefine hydrocarbons by means of a phosphoric acid film catalyst the method of quickly altering the effective capacity of a given plant to accommodate changes in the available supply of olefine containing gas which comprises the step of regulating the partial pressure of water vapor associated with said olefines in a ratio inverse to the quantity of gas entering the catalyst unit.

3. A process for the catalytic polymerization of normally gaseous olefine hydrocarbons to liquids which comprises passing a gas containing said olefines over a catalyst consisting of a thin film of phosphoric acid adsorbed on a non-porous inert support maintained under polymerizing conditions of temperature and pressure and holding said temperature and pressure substantially constant while varying the supply of said olefine containing gas and simultaneously inversely varying its water vapor content.

4. In a process for the catalytic polymerization of normally gaseous olefine hydrocarbons to liquid motor fuels by means of a phosphoric acid-film catalyst the method of maintaining the nature and extent of polymerization constant while varying the time of reaction at constant temperature and pressure which consists in varying the partial pressure of water vapor in the gas mixture passing over the catalyst in inverse ratio to the rate of passage.

WILLIAM N. DAVIS.